(12) United States Patent
Corman

(10) Patent No.: US 10,597,165 B2
(45) Date of Patent: Mar. 24, 2020

(54) METHOD OF MANUFACTURING A STRAINER, A STRAINER, AND AN EJECTOR COMPRISING SUCH A STRAINER

(71) Applicant: Zodiac Aerotechnics, Roche la Moliere (FR)

(72) Inventor: Francois Corman, Lyons (FR)

(73) Assignee: Zodiac Aerotechnics (FR)

( * ) Notice: Subject to any disclaimer, the term of this patent is extended or adjusted under 35 U.S.C. 154(b) by 234 days.

(21) Appl. No.: 15/485,986

(22) Filed: Apr. 12, 2017

(65) Prior Publication Data

US 2017/0291714 A1    Oct. 12, 2017

(30) Foreign Application Priority Data

Apr. 12, 2016 (FR) ...................... 16 53187

(51) Int. Cl.
*B64D 37/00* (2006.01)
*F02M 37/00* (2006.01)
*F02M 37/02* (2006.01)
*B32B 15/00* (2006.01)
*B33Y 70/00* (2020.01)
*B33Y 80/00* (2015.01)
*F02M 37/50* (2019.01)
*B33Y 10/00* (2015.01)
*B01D 29/03* (2006.01)
(Continued)

(52) U.S. Cl.
CPC .......... *B64D 37/005* (2013.01); *B01D 29/03* (2013.01); *B01D 35/30* (2013.01); *B32B 15/00* (2013.01); *B33Y 10/00* (2014.12); *B33Y 70/00* (2014.12); *B33Y 80/00* (2014.12); *B64D 37/04* (2013.01); *F02M 37/0011* (2013.01); *F02M 37/0082* (2013.01); *F02M 37/025* (2013.01); *F02M 37/50* (2019.01)

(58) Field of Classification Search
CPC ...... B64D 37/005; B64D 37/04; F02M 37/50; F02M 37/025; F02M 37/0082; F02M 37/0011; B32B 15/00; B33Y 10/00; B33Y 80/00; B33Y 70/00; B01D 35/30; B01D 29/03
See application file for complete search history.

(56) References Cited

U.S. PATENT DOCUMENTS 5,779,355 A * 7/1998 Pullman ................... F04F 5/20
                                                      366/137
6,988,491 B2    1/2006 Burhenne et al.
(Continued)

FOREIGN PATENT DOCUMENTS

EP           2006526 A2    12/2008
WO    WO-2014071135 A1 *  5/2014  ........... B22F 3/1055

*Primary Examiner* — Krishnan S Menon
*Assistant Examiner* — Waqaas Ali
(74) *Attorney, Agent, or Firm* — Forge IP, PLLC

(57) ABSTRACT

A method for manufacturing a strainer, such as a strainer of an ejector used to transfer fuel between two tanks of an aircraft or to supply fuel to an engine is provided. The strainer includes a conduit whereof a first end is intended to be connected to an inlet of the ejector, and whereof a second end is located within a housing including an open face for the passage of fuel, the open face being closed off by a grate acting as a filter. The method includes the step of manufacturing the conduit, the housing and the grate of the strainer as a single monobloc part.

12 Claims, 1 Drawing Sheet

(51) Int. Cl.
  *B01D 35/30* (2006.01)
  *B64D 37/04* (2006.01)

(56) References Cited

U.S. PATENT DOCUMENTS

2009/0255261 A1* 10/2009 McMasters .............. B23P 6/007
                                                      60/737
2015/0285502 A1   10/2015 DiCintio et al.

* cited by examiner

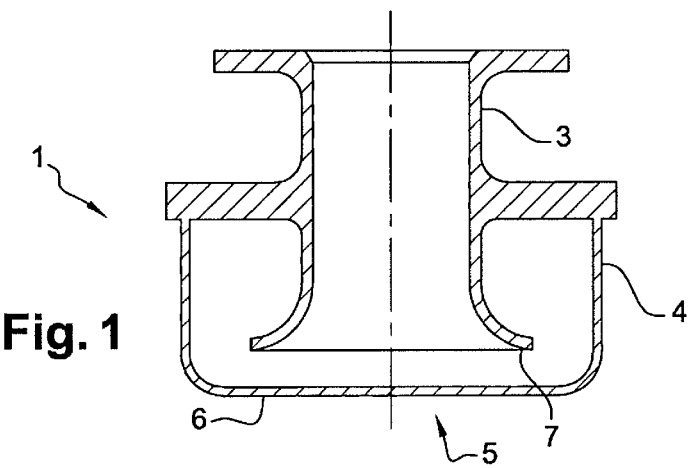
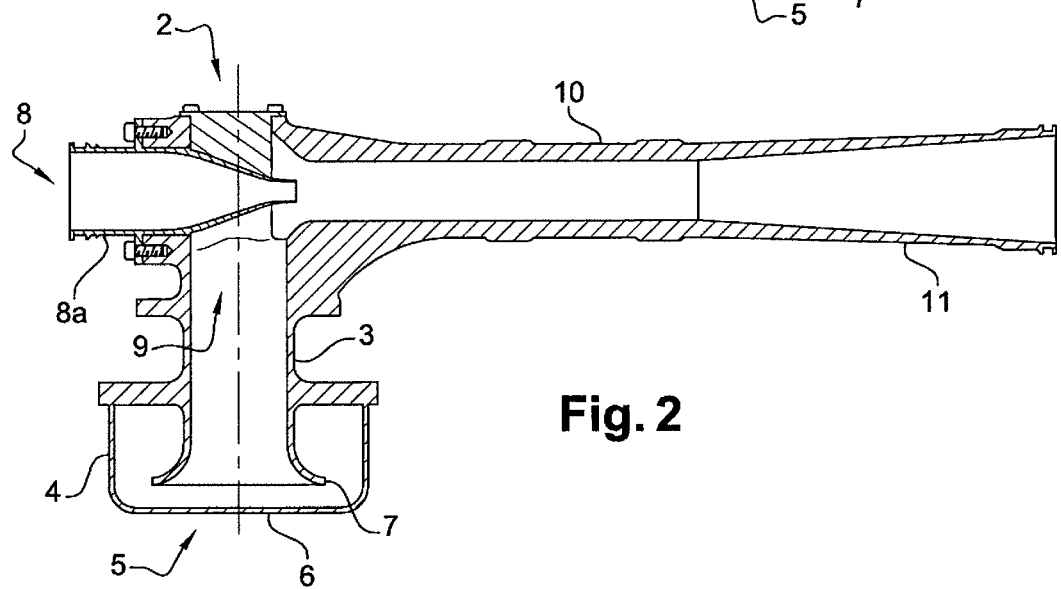
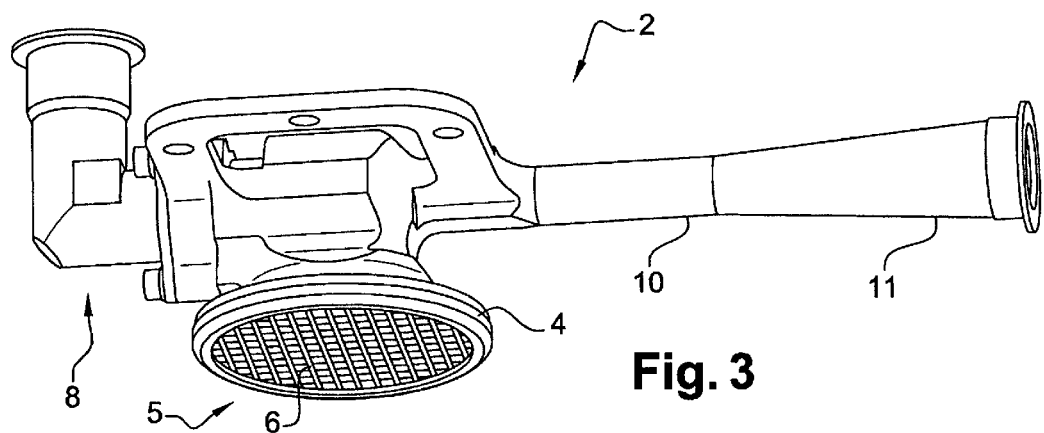

METHOD OF MANUFACTURING A STRAINER, A STRAINER, AND AN EJECTOR COMPRISING SUCH A STRAINER

FIELD OF THE INVENTION

The present invention relates to the technical field of aeronautics, and more particularly relates to a method for manufacturing a strainer, such as a strainer of an ejector used to transfer fuel between two fuel tanks of an aircraft or to supply an engine with fuel.

The invention also relates to an improved strainer, and an ejector comprising such a strainer. The strainer according to the invention may be attached to any type of device that requires filtration before the passage of a fluid, for example a pump, or a rupture disc calibrated to burst at a predetermined pressure, implemented within an installation that is subjected to pressure.

BACKGROUND OF THE INVENTION

In the aeronautics field, it is known to use ejectors supplied by a motive flow, for example supplied by a reactor outlet or by a pump to transfer fuel between two fuel tanks of an aircraft.

Indeed, when the tank unit of the aircraft is made up of several tanks, it is necessary for the fuel to be transferred from tank to tank, in particular using an ejector.

The ejector is supplied with a stream of fuel and operates according to the principle of the Venturi affect. The stream of fuel in particular enters a frustoconical injector with a calibrated outlet diameter, smaller than the inlet diameter, to accelerate the stream of fuel. The outlet of the injector communicates with a secondary inlet of the ejector, arranged orthogonally to the outlet stream of the injector, and from which a second stream of fuel that is present in a first tank is aspirated by the Venturi effect. The two streams of fuel are mixed, and then propelled in a diffusion pipe of the ejector, arranged to be coaxial with the outlet of the injector with an outlet neck having a flared frustoconical shape in order to slow down the stream. The outlet neck communicates with a second tank to transfer the fuel therein.

The main advantage of this type of ejector is that it does not wear out and it does not require any maintenance, since it operates with no moving mechanical parts. Also, given that it works without an electric motor, it does not present any risk of fire or explosion. It can thus be positioned within zones with an explosive atmosphere, and optionally that are difficult to access.

Preferably, the second inlet of the ejector is attached to a strainer comprising a conduit, a first end of which is intended to be connected to the secondary inlet of the ejector, and a second end of which is located within a housing comprising an open face, preferably across from the end of the conduit, for the passage of the fuel. The open face of the housing is closed off by a metal grate acting as a filter. The housing is intended to be submerged in a first fuel tank.

From the foregoing, a strainer comprises several components assembled to one another. Each of these components must be managed in terms of design, validation, manufacturing, procurement and storage. For example, during its design, each component has undergone various molding, machining, shaping, etc. operations.

In order to manufacture the strainer, mounting and assembly operations are necessary, and involve using additional components, such as screws, washers, seals, etc. and/or specific operations, such as crimping operations, etc., requiring suitable tools and machines.

As a result, the design and manufacture of a strainer is time-consuming, costly and tedious. Furthermore, it has been observed that the electrical continuity between the components of the strainer was not sufficient, such that this required implementing additional protection and surface treatments, making the manufacturing process still more complex, and thus increasing its cost.

SUMMARY OF THE INVENTION

One of the aims of the invention is therefore to resolve these drawbacks by proposing a method for manufacturing a strainer, such as an ejector strainer, that is simple, quick and inexpensive, and that makes it possible to obtain a reliable strainer that exhibits optimal electrical continuity.

To that end, and to resolve the aforementioned problems, a method has been developed for manufacturing a strainer, such as a strainer of an ejector used to transfer fuel between two fuel tanks of an aircraft or to supply an engine with fuel. The strainer comprises a conduit, a first end of which is for example intended to be connected to an inlet of the ejector, and a second end of which is located within a housing comprising an open face for the passage of the fuel. The open face of the housing is closed off by a grate acting as a filter.

According to the invention, the method is remarkable in that it consists of manufacturing the conduit, the housing and the grate of the strainer as a single monobloc part, preferably made from metal, for example aluminum.

In this way, the method for manufacturing the strainer according to the invention implements only one part. In other words, there is only one part to be managed in terms of design, validation, manufacturing, procurement, storage. Manufacturing is easy, quick and inexpensive. Furthermore, given that the strainer is made as a single part, with no fastening means, the electrical continuity is optimal, and the strainer is lighter.

The invention makes it possible to avoid handling and assembly operations, and to improve the repeatability of the method.

Advantageously, the strainer is made at the same time as a fuel ejector, with the first end of the conduit of the strainer connected as a single part to an inlet of the ejector. This makes it possible to incorporate the strainer into the design of the ejector and to no longer have to manage it as an independent part. Furthermore, the fastening elements between the strainer and the ejector are eliminated, which makes the manufacturing even easier and makes it possible to minimize costs.

The invention lastly provides an ejector for example used to transfer fuel between two tanks of an aircraft, or to supply an engine with fuel. The ejector comprises an injector with an inlet, forming a main inlet of the ejector, and having a calibrated diameter, and a frustoconical outlet with a smaller diameter. The outlet of the injector is in communication on the one hand with a so-called secondary inlet of the ejector, arranged orthogonally to the outlet of the injector, and on the other hand with a diffusion pipe, arranged coaxially to the outlet of the injector, with an outlet neck having a flared frustoconical shape.

According to the invention, the secondary inlet of the ejector is connected to a strainer formed as one single monobloc part, with said strainer also forming a single part with at least said secondary inlet.

Thus, the number of parts is further decreased, which makes it possible to further increase the advantages of the present invention.

From the preceding, the invention aims to broadly protect a strainer, whereof the conduit, housing and grate of the strainer are made as one single monobloc part, advantageously integral to an ejector, independently of the manufacturing technique used.

Preferably, and to simplify the design and manufacturing, and to further decrease the costs, the manufacturing method is advantageously performed using an additive, layer-by-layer manufacturing technique.

BRIEF DESCRIPTION OF THE DRAWINGS

Further advantages and features will become more apparent from the following description, given by way of a non-limiting example, of the strainer and the ejector according to the invention, from the attached drawings wherein:

FIG. 1 is a longitudinal sectional schematic view of the strainer according to the invention;

FIG. 2 is a longitudinal sectional schematic view of an ejector according to the invention incorporating the strainer;

FIG. 3 is a schematic perspective view of a single-part ejector and strainer assembly according to the invention.

DETAILED DESCRIPTION OF THE INVENTION

The invention broadly relates to a strainer (1), without limitation regarding its application, and will be described in relation to an ejector (2) used to transfer fuel between two fuel tanks of an aircraft or to supply fuel to an engine. The strainer (1) according to the invention is manufactured as a single part, and preferably from metal, such as aluminum. The strainer (1) can be attached to any device requiring filtration before the passage of a fluid, for example a pump or a rupture disc.

With reference to FIGS. 1 and 2, the strainer (1) comprises a conduit (3), one end of which is located with a housing (4). The housing (4) comprises a generally cylindrical shape, coaxial to the conduit (3), and has an open face (5) across from the end of the conduit (3) for the passage of the fuel. The open face (5) is closed off by a grate (6) to act as a filter. The end of the conduit (3) that is located within the housing (4) comprises a flared frustoconical shaped neck (7).

The conduit (3), the housing (4) and the grate (6) are manufactured as a single part in order to form one monobloc part.

With reference to FIGS. 2 and 3, the end of the strainer (1) that is not located within the housing (4) is for example intended to be connected to an inlet of an ejector (2).

More specifically, and in reference to FIG. 2, an ejector (2) is used to transfer fuel between two tanks of an aircraft and comprises an injector (8), in the form of a conduit (8a), with an inlet having a calibrated diameter, and a frustoconical outlet with a diameter smaller than the diameter of the inlet. The injector (8) is intended to be connected to a pump that supplies it with a stream of fuel. The configuration of the injector (8) makes it possible to accelerate this stream of fuel at the outlet.

The outlet of the injector (8) is in communication on the one hand with a secondary inlet (9) of the ejector (2) arranged orthogonally to the outlet of the injector (8), and on the other hand with a diffusion pipe (10), arranged coaxially to the outlet of the injector (8), with an outlet neck (11) having a flared frustoconical shape.

The secondary inlet (9) of the ejector (2) is connected with the conduit (3) of the strainer (1), the housing (4) of which is submerged in a first fuel tank. The outlet of the ejector (2) communicates with a second tank for the fuel transfer as such.

The accelerated stream of fuel coming from the injector (8) causes aspiration by means of a Venturi effect of a second stream of fuel that traverses the grate (6), the housing (4) and the conduit (3) of the strainer (1). The fuel stream mixture is propelled within the diffusion pipe (10) and is slowed down at the outlet, due to the flared outlet neck (11), to be transferred to the second tank.

Advantageously, the strainer (1) is manufactured as a single part with the secondary inlet (9) of the ejector (2).

The manufacturing technique used for example consists of an additive, layer-by-layer manufacturing technique.

The strainer (1) according to the invention comprises a single part, such that its design, validation, manufacture, procurement and storage are made easier. Manufacturing is easy, quick and inexpensive. Furthermore, given that the strainer (1) is made as a single part, with no fastening means, the electrical continuity is optimal, and the strainer (1) is lighter. These advantages are amplified if the strainer (1) forms an integral and monobloc part of the ejector (2).

What is claimed is:

1. A method for manufacturing a strainer used to transfer fuel between two tanks of an aircraft or to supply fuel to an engine, said strainer comprising:

a housing having an open face for passage of the fuel, the open face being closed off by a grate acting as a filter; and a conduit having a first open end and a second open end with a fuel passageway extending from the first open end to the second open end, wherein the first open end of the passageway is adapted to be connected to an inlet of an ejector, and wherein the second open end of the passageway terminates within the housing, the method being characterized in that the method comprises the step of manufacturing the conduit, the housing and the grate of the strainer as a single monobloc part.

2. The method according to claim 1, characterized in that the conduit, the housing and the grate of the strainer are made from metal.

3. The method according to claim 1, characterized in that the strainer is made at the same time as an ejector, with the first end of the conduit of the strainer connected as a monobloc part with an inlet of the ejector.

4. The method according to claim 1, characterized in that the manufacturing is performed using an additive, layer-by-layer manufacturing technique.

5. The method according to claim 2, characterized in that the conduit, the housing and the grate of the strainer are made from aluminum.

6. A method for manufacturing a device adapted to transfer fuel between two tanks of an aircraft or to supply fuel to an engine, said method comprising the steps of:

manufacturing, as a single monobloc part, a strainer comprising a housing having an open face for passage of the fuel, the open face being closed off by a grate acting as a filter, and a conduit having a first open end and a second open end with a fuel passageway extending therebetween, and wherein the second open end of the passageway terminates within the housing;

providing an ejector comprising an inlet adapted to be connected to a stream of fuel, a secondary inlet and a common outlet; and connecting the first open end of the passageway of the conduit of the strainer to the secondary inlet of the ejector.

7. The method according to claim 6, characterized in that the inlet adapted to be connected to a stream of fuel comprises an injector with an inlet and a frustoconical outlet having a diameter smaller than a diameter of the inlet of the injector.

8. The method according to claim 6, characterized in that the common outlet of the injector comprises a neck having a frustoconical shape.

9. The method according to claim 6, characterized in that the conduit, the housing and the grate of the strainer are made from metal.

10. The method according to claim 9, characterized in that the conduit, the housing and the grate of the strainer are made from aluminum.

11. The method according to claim 6, characterized in that the strainer is made at the same time as the ejector, with the first open end of the passageway of the conduit of the strainer connected as a monobloc part with the secondary inlet of the ejector.

12. The method according to claim 6, characterized in that the manufacturing step is performed using an additive, layer-by-layer manufacturing technique.

* * * * *